Oct. 9, 1956    H. W. OBERG    2,765,992
FIXED WING AND HELICOPTER SUSTAINED AIRCRAFT
Filed Aug. 19, 1955    2 Sheets-Sheet 1
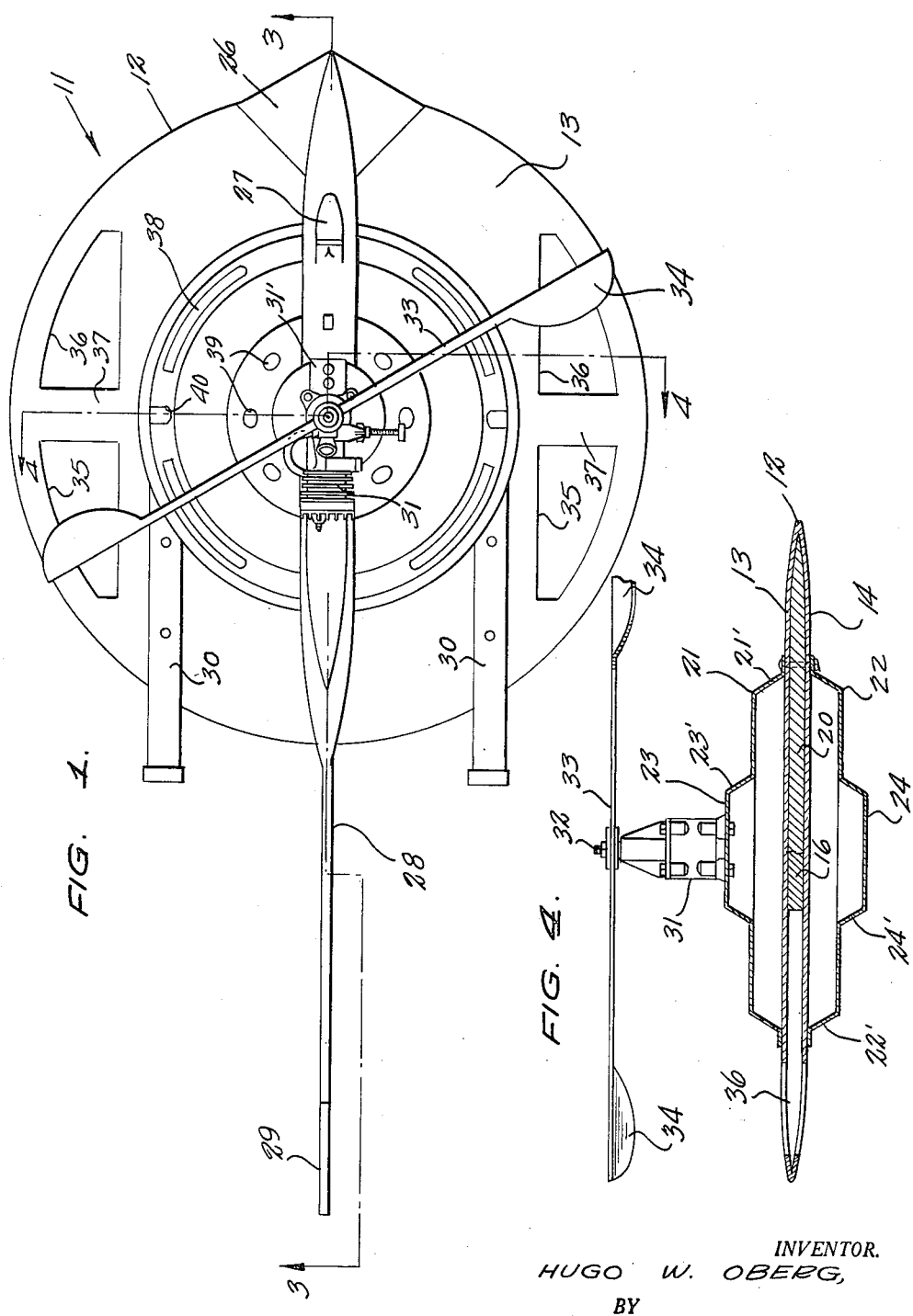
INVENTOR.
HUGO W. OBERG,
BY
McMorrow, Berman & Davidson
ATTORNEYS.

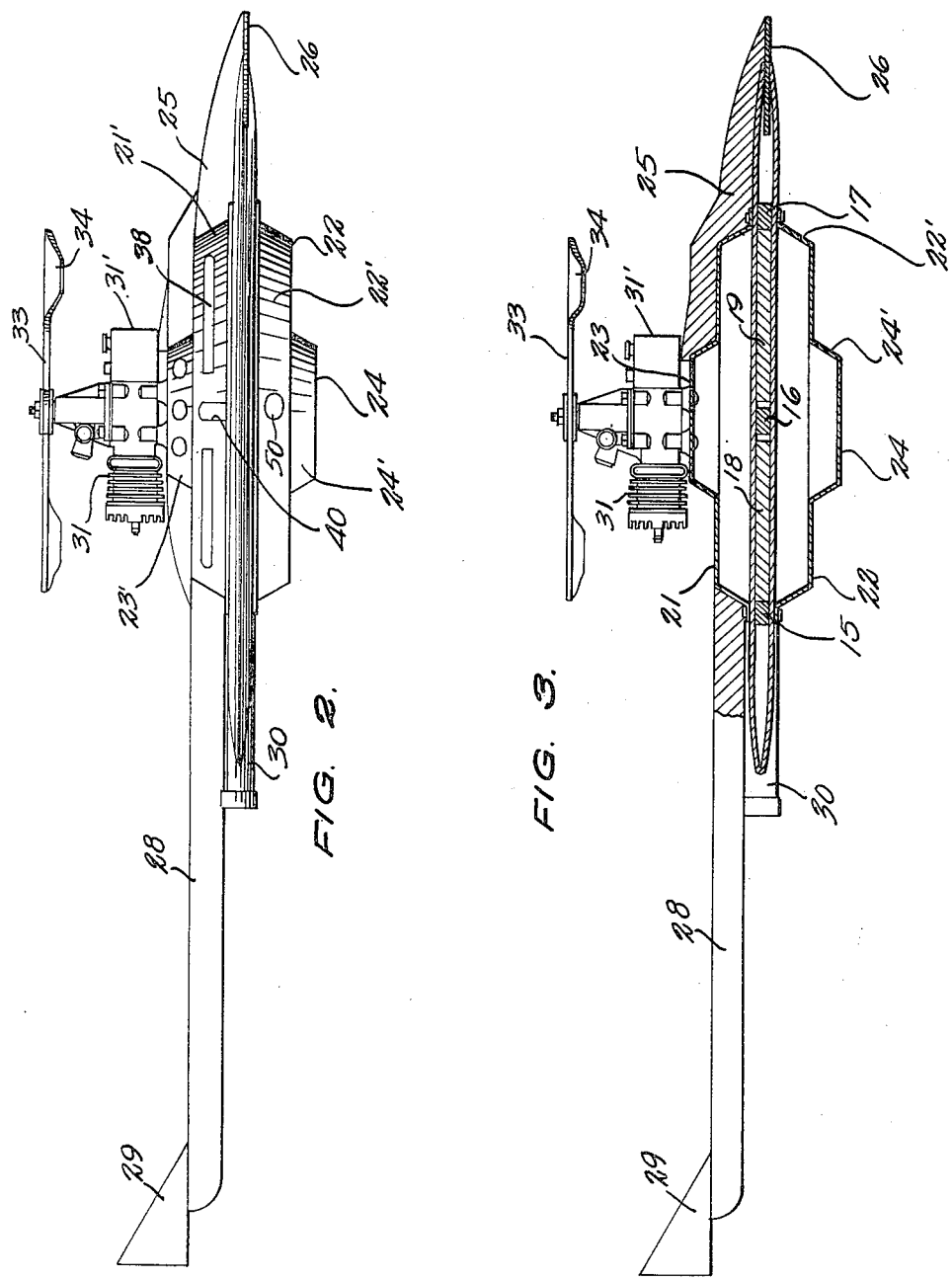

United States Patent Office 2,765,992
Patented Oct. 9, 1956

2,765,992

FIXED WING AND HELICOPTER SUSTAINED AIRCRAFT

Hugo W. Oberg, Poulsbo, Wash.

Application August 19, 1955, Serial No. 529,483

4 Claims. (Cl. 244—6)

This invention relates to aircraft, and more particularly to an aircraft of the helicopter type wherein the main lifting force is derived from a horizontally rotating, relatively large propeller which revolves around a substantially vertical axis.

A main object of the invention is to provide a novel and improved aircraft of the helicopter type which may be either a passenger aircraft or may be embodied in a model aircraft, the aircraft being simple in construction, involving relatively few parts, being easy to control, and being relatively compact in size.

A further object of the invention is to provide an improved aircraft of the helicopter type which employs a novel and efficient method of deriving an upward thrust from the horizontal revolving propeller blades thereof, the aircraft being relatively inexpensive to manufacture, being durable in construction, being easy to maneuver, and being relatively stable in flight.

Further objects and advantages of the invention will become apparent from the following description and claims, and from the accompanying drawings, wherein:

Figure 1 is a top view of one form of the improved aircraft constructed in accordance with the present invention.

Figure 2 is a side elevational view of the improved aircraft shown in Figure 1.

Figure 3 is a longitudinal vertical cross sectional view taken on the line 3—3 of Figure 1.

Figure 4 is a transverse vertical cross sectional view taken on line 4—4 of Figure 1.

Referring to the drawings, the improved aircraft is designated generally at 11 and comprises a relatively flat circular body 12 which is of hollow construction and which is formed by a downwardly concave, relatively thin circular top wall 13 of any suitable durable sheet material having substantial stiffness, such as sheet plastic material, an upwardly concave circular bottom wall 14 similar to the top wall 13, and spaced block members 15, 16 and 17 secured to the inside surfaces of the top and bottom circular walls 13 and 14 and thus connecting said top and bottom walls. Between the block members 15, 16 and 17, additional longitudinally extending stiffening members 18 and 19 may be secured, and transversely extending stiffening members 20 may be secured between the top and bottom walls 13 and 14, said stiffening members 20 extending from the intermediate longitudinal block member 16 laterally and providing transverse reinforcements of the main body 12.

Externally secured to the top and bottom walls 13 and 14 concentrically therewith are the respective dome-like passenger housings 21 and 22, said housings being of substantially smaller diameter than the main body 12, as is clearly shown in Figures 3 and 4. The upper passenger housing 21 has the upstanding central auxiliary compartment 23, and the bottom passenger housing 22 has the depending central auxiliary compartment 24, the compartments 23 and 24 being circular in shape and being of similar diameters, as shown in Figures 2, 3 and 4.

The peripheral walls of the housings 21 and 22 are preferably conical, as are the peripheral walls of the auxiliary housings 23 and 24, as shown respectively at 23' and 21' and at 22' and 24'.

Rigidly secured on the passenger compartments 21 and extending forwardly therefrom radially over the body 12 and secured thereto is the nose fuselage 25, said nose fuselage projecting beyond the periphery of the body 12 and being secured to a substantially horizontal, generally diamond-shaped plate member 26 which extends between and is secured inside the body 12 beneath the fuselage 25, as shown in Figure 3. In an actual passenger aircraft, the nose fuselage 25 may be employed as a pilot's compartment, and in a model aircraft may be merely shaped to simulate such a compartment, as by the provision of a simulated pilot's observation window 27, shown in Figure 1.

The diamond-shaped front plate member 26 is employed both to provide a rigid connection between the nose fuselage 25 and the top and bottom walls 13 and 14 of the circular main body 12, as well as to provide a forward extension of the air foil defined by the circular body 12. In a model aircraft, the function of the member 26 is to serve as a protective means to prevent damage to the body 12 when the aircraft strikes the ground. The member 26 may be formed of any suitable relatively rigid sheet material, such as sheet plastic, corrugated sheet material, or the like.

Secured to the top passenger compartment 21 and diametrically aligned with the nose fuselage 25 is the elongated, outwardly extending tail fuselage 28, said fuselage 28 comprising a vertical, elongated bar member of suitable rigid, relatively light material, such as a plastic bar member in the case of a model aircraft. As shown in Figure 1, 2 and 3, the tail fuselage 28 is in alignment with the nose fuselage 25 and extends outwardly a substantial distance beyond the peripheral edge of the main body 12. Secured on the outer end of the tail fuselage 28 is an upstanding vertical sabilizer vane 29 of substantial area which is located in the vertical plane of the tail fuselage member 28, as is clearly shown in Figure 1.

In the case of a model aircraft, simulated longitudinally extending jet conduits 30, 30 may be mounted in the circular body 12, said jet conduits extending parallel to the tail fuselage 28 and being spaced diametrically on opposite sides thereof. In an actual aircraft, actual jet conduits may be employed in the positions of the simulated conduits 30, since these are the correct positions for such jet conduits in a passenger aircraft.

Centrally mounted on the top wall of the auxiliary passenger compartment 23 is a motor 31, which may be an internal combustion engine, the motor including a suitable fuel tank 31' at its forward portion and being mounted with its shaft vertical and axially located with respect to the body 12, as shown at 32. Secured on the top end of the shaft 32 is a horizontally extending propeller 33 of the double-bladed type, said propeller extending substantially parallel to the body 12 and extending diametrically thereover substantially the entire width of said body. The propeller 33 is provided at its end portions with respective arcuately curved blades 34, 34 of substantial area which overlie the outer portions of the circular body 12, as is clearly shown in Figures 1 and 4.

The circular body 12 is formed with air release apertures 35 and 36 at the outer portions thereof underlying the path of travel of the propeller blade elements 34, the apertures 35 and 36 being spaced symmetrically on opposite sides of a transverse horizontal line extending through the axis of body 12, said apertures defining respective transversely extending connecting elements 37, 37 located between each set of apertures 35 and 36, as shown in Figure 1. As is shown in Figure 1, apertures 35 and 36 are arranged symmetrically on opposite sides of the longitudinal center line defined by fuselage elements 28 and 25 and are spaced outwardly of the jet tubes 30, 30. The apertures 35 and 36 are of substantial area and provide a downward thrust each time a propeller blade 34 passes thereover, said downward thrust developing a substantial portion of the blast required to elevate the aircraft. The size of the apertures 35 and 36 is of course determined by the size of the propeller blades 34, the spacing of said blades above the apertures, and the amount of horse power available from the internal combustion engine 31.

In the case of the model aircraft, the propeller blades will provide sufficient lift to elevate the aircraft and the circular body 12 will serve as an air foil means to sustain the aircraft and to provide a gradual descent thereof when the speed of rotation of the propeller 33 slackens, or ceases entirely.

The aircraft will be guided longitudinally by the stabilizing effect of the vertical fuselage bar 28 and the upstanding vertical stabilizer 29 mounted thereon. In the case of an actual passenger aircraft, forward propulsion will be provided by the jet conduits 30, 30 and lift will be provided by the rotating horizontal propeller 33. As above explained, the lift is developed by the upward thrust produced when the blades 34 pass over the respective pairs of apertures 35 and 36 of the opposite sides of the body 12. In flight, the blades 34 may rotate at a sufficient speed to merely provide support for the aircraft at a desired elevation, and if it is desired to elevate the aircraft, the speed of rotation of the propeller 33 may be accordingly increased. Conversely, to allow the aircraft to descend, the speed of rotation of the propeller 33 is decreased.

As shown in Figure 1, the passenger compartments 21 and 23 are provided with windows 38 and 39 in their peripheral walls, and the main passenger compartment 21 is provided with suitable doorways 40 in its peripheral wall, the doorways being located at the opposite sides of the aircraft, as shown.

The housing 22 may also be provided with windows. The peripheral wall of housing 22 has the valve jet apertures 50, as shown. In an actual aircraft, said apertures are selectively opened for the purpose of controlling the tilt of the aircraft in respective different directions.

While a specific embodiment of an improved aircraft has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an aircraft, a flat circular body, a passenger housing centrally mounted on said body, a vertical propeller shaft journaled on said passenger housing on the axis of said body, a propeller secured on the top end of said propeller shaft substantially parallel to said body and extending diametrically over substantially the entire width of said body, said propeller having blade elements of relatively large area overlying the outer portions of said body, said body being formed with air release apertures of substantial size at said outer portions, a motor mounted on said passenger housing and being drivingly coupled to said propeller, and an elongated vertical fuselage member rigidly secured to said passenger housing and extending a substantial distance outwardly from the periphery of said circular body.

2. In an aircraft, a flat circular body, a passenger housing centrally mounted on the top surface of said body, an additional circular passenger housing centrally secured to and depending from the underside of said circular body, a vertical propeller shaft journaled on said passenger housing on the axis of said body, a propeller secured on the top end of said propeller shaft substantially parallel to said body and extending diametrically over substantially the entire width of said body, said propeller having blade elements of relatively large area overlying the outer portions of said body, said body being formed with air release apertures of substantial size at said outer portions, a motor mounted on said passenger housing and being drivingly coupled to said propeller, and an elongated vertical fuselage member rigidly secured to said passenger housing and extending a substantial distance outwardly from the periphery of said circular body.

3. In an aircraft, a flat circular body, a circular passenger housing centrally mounted on the top surface of said body, an additional circular passenger housing centrally secured to and depending from the underside of said circular body, a vertical propeller shaft journaled on said passenger housing on the axis of said body, a propeller secured on the top end of said propeller shaft substantially parallel to said body and extending diametrically over substantially the entire width of said body, said propeller having blade elements of relatively large area overlying the outer portions of said body, said body being formed with air release apertures at its opposite sides, said apertures being of substantial size and being located at the outer portions of said circular body, a motor mounted on said passenger housing and being drivingly coupled to said propeller, an elongated vertical fuselage member rigidly secured to said passenger housing and extending a substantial distance outwardly from the periphery of said circular body, and an upstanding vertical stabilizer vane of substantial area secured to the outer end of said fuselage member in the plane of said fuselage member.

4. In an aircraft, a flat hollow circular body, a circular passenger housing centrally mounted on the top surface of said body, an additional circular passenger housing centrally secured to and depending from the underside of said circular body, a vertical propeller shaft journaled on said passenger housing on the axis of said body, a nose fuselage element secured on said first-named passenger housing and said body and extending radially over said body, a propeller secured on the top end of said propeller shaft substantially parallel to said body and extending diametrically over substantially the entire width of said body, said propeller having blade elements of relatively large area overlying the outer portions of said body, said body being formed at its outer portions on the opposite sides of the body with air release apertures of substantial size, a motor mounted on said passenger housing and being drivingly coupled to said propeller, an elongated vertical fuselage member rigidly secured to said passenger housing diametrically opposite said nose fuselage element and extending a substantial distance outwardly from the periphery of said circular body, and an upstanding vertical stabilizer vane of substantial area secured to the outer end of said fuselage member in the plane of the last-named fuselage member.

References Cited in the file of this patent

UNITED STATES PATENTS

| 1,681,761 | Blasi | Aug. 21, 1928 |
| 2,054,610 | Volpicelli | Sept. 15, 1936 |
| 2,575,886 | Myers | Nov. 20, 1951 |

FOREIGN PATENTS

| 570,263 | France | Jan. 15, 1924 |